United States Patent [19]

Lane

[11] 4,385,913
[45] May 31, 1983

[54] DEVICE FOR ELIMINATING DROPLETS OF LIQUID FROM A GAS STREAM

[76] Inventor: Arlo E. Lane, 2416 Wildwood Rd., Reading, Mich. 49274

[21] Appl. No.: 325,510

[22] Filed: Nov. 27, 1981

[51] Int. Cl.³ .............................................. B01D 53/04
[52] U.S. Cl. ...................................... 55/350; 55/387; 55/484; 55/DIG. 17
[58] Field of Search .............. 55/341 R, 341 NT, 344, 55/350, 387, 484, DIG. 17; 210/323.2, 433.1, 434

[56] References Cited

U.S. PATENT DOCUMENTS

| | | | |
|---|---|---|---|
| 1,869,589 | 8/1932 | Tischer | 55/350 X |
| 2,214,737 | 9/1940 | Dauphinee | 55/350 |
| 3,143,499 | 8/1964 | Miller | 210/434 X |
| 3,307,335 | 3/1967 | Shomaker | 55/484 X |
| 3,747,765 | 7/1973 | Nowak | 210/323.2 X |
| 3,822,018 | 7/1974 | Krongos | 210/323.2 |
| 4,052,317 | 10/1977 | Palnik | 210/323.2 |
| 4,116,650 | 9/1978 | Lane | 55/DIG. 17 |
| 4,177,049 | 12/1979 | Haslett, Jr. | 55/DIG. 17 |

Primary Examiner—Robert H. Spitzer
Attorney, Agent, or Firm—James W. Pearce; Roy F. Schaeperklaus

[57] ABSTRACT

A device for eliminating droplets of liquid from a gas stream. A spindle member is mounted in a tubular body. The spindle member includes upper and lower disc portions sealed at their edges to the tubular body and a plurality of tubular portions spanning the upper and lower disc portions. A base member closes a lower end of the tubular body. A mixing chamber is provided inside the body below the lower disc member. A head member closes an upper end of the tubular body. A pair of chambers is formed in the head member facing the interior of the tubular body. Openings in the disc members provide communication from one of the chambers in the head member through the interior of the tubular portions to the mixing chamber. Return openings in the upper and lower disc members provide communication between the mixing chamber and the other chamber in the head member. Liquid absorbent plug members are mounted in the tubular portions. Gas that can carry liquid is introduced into the first mentioned chamber in the head member to flow through the plug members so that droplets of liquid in the gas are absorbed in and evaporated from the plug members. The gas is mixed in the mixing chamber, and the gas passes from the mixing chamber through the discharge openings in the lower and upper disc members into the other chamber in the head member to be discharged.

4 Claims, 4 Drawing Figures

DEVICE FOR ELIMINATING DROPLETS OF LIQUID FROM A GAS STREAM

This invention relates to a device for eliminating droplets of liquid from a gas stream. More particularly, this invention relates to a device for eliminating droplets of water from a stream of compressed air.

Devices for eliminating water droplets from compressed air are shown in my U.S. Pat. No. 4,116,650 and in my co-pending application for patent, Ser. No. 134,876 filed Mar. 28, 1980, abandoned. The devices of the patent and the application have limited capacity. An object of this invention is to provide a device of this type having a substantial capacity.

A further object of this invention is to provide such a device in which compressed air is directed through a plurality of parallel arranged cartridges in which droplets of water are absorbed and evaporated into the air stream to eliminate the droplets of water.

A further object of this invention is to provide such a device in which the compressed air, after droplets have been eliminated, is passed through a mixing chamber to cause thorough mixing of the droplet-free air.

A further object of this invention is to provide such a device in which a plurality of mixing chambers is provided in series.

A further object of this invention is to provide such a device in which the mixing chambers are formed in a container which houses the cartridges.

Briefly, this invention provides a device for eliminating droplets of liquid from a gas stream which comprises a tubular body, a spindle member mounted in the tubular body, a base member, and a head member. The spindle member includes an upper disc portion sealed at its edges to the tubular body, a lower disc member sealed at its edges to the tubular body, and a plurality of tubular portions spanning the upper and lower disc portions. The base member closes a lower end of the tubular body. A mixing chamber is formed inside the body below the lower disc member. Openings in the lower disc member provide communication between the mixing chamber and the interior of the tubular portions. A head member closes an upper end of the tubular body. A pair of chambers is formed in the head member facing the interior of the tubular body. Openings in the upper disc portion provide communication between one of the chambers and the interior of the tubular portions. Return openings in the upper and lower disc members provide communications between the mixing chamber and the other chamber in the head member. Liquid absorbent plug members are mounted in the tubular portions. Liquid carrying gas such as compressed air, which can contain droplets of water, is introduced into the first mentioned chamber in the head member to flow through the plug members so that the droplets of liquid in the gas are absorbed in and evaporated from the plug members. The gas is mixed in the mixing chamber. The gas passes from the mixing chamber through the discharge openings in the lower and upper disc members into the other chamber in the head member. The gas is discharged from the other chamber in the head member.

The above and other objects and features of the invention will be apparent to those skilled in the art to which this invention pertains from the following detailed description and the drawing, in which.

In the following detailed description and the drawing, like reference characters indicate like parts.

Figure 1:
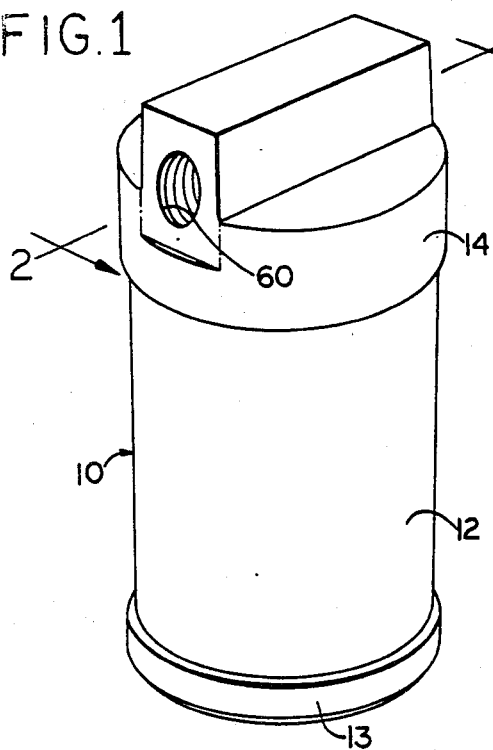
FIG. 1 is a perspective view of a device for eliminating droplets from a gas stream which is constructed in accordance with an embodiment of this invention.
Figure 2:
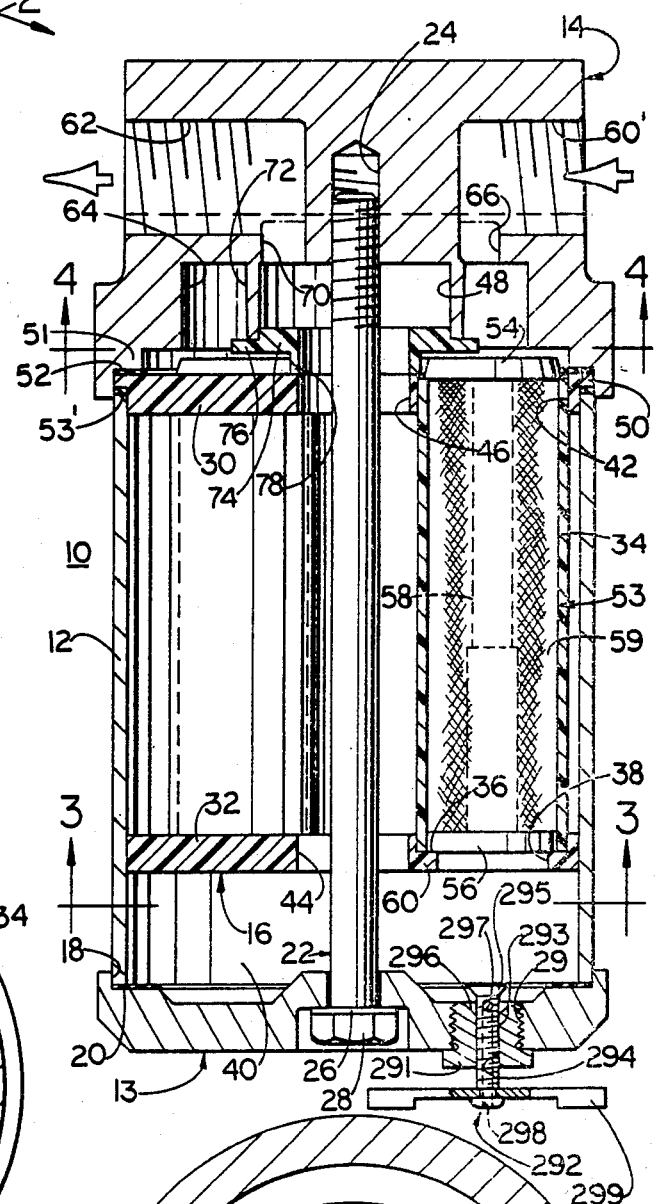
FIG. 2 is a view in section taken on the line 2—2 in FIG. 1.
Figure 3:
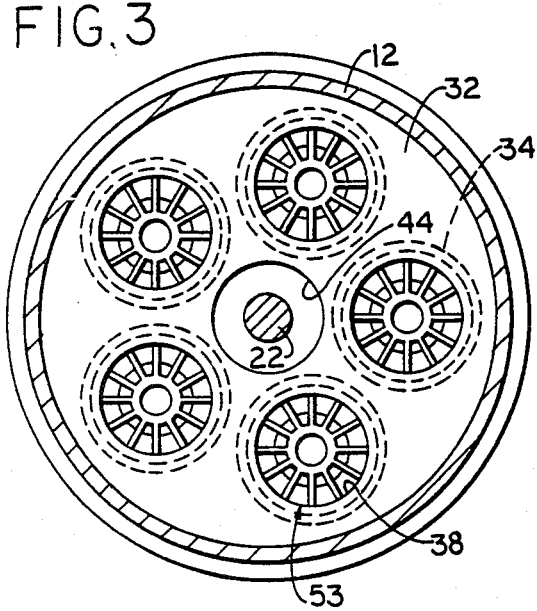
FIG. 3 is a view in section taken on the line 3—3 in FIG. 2.
Figure 4:
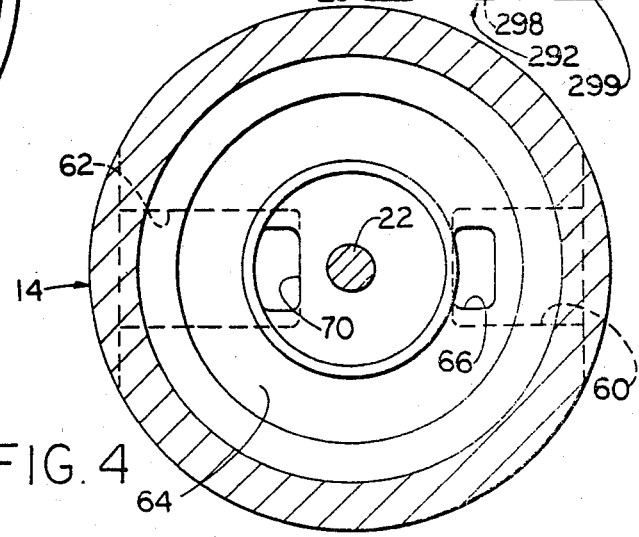
FIG. 4 is a view in section taken on the line 4—4 in FIG. 2.

In the drawing is shown a device 10 constructed in accordance with an embodiment of this invention. The device 10 includes a tubular casing 12, a base member 13, a head member 14 and a spindle member 16. The base member 13 is provided with a well 18 in which an edge portion of the tubular casing 12 is received. A gasket 20 forms a seal between the tubular casing 12 and the base member 13. A fastener 22 extends through a central opening in the base member 13 and is threaded in a socket 24 in the head 14. A resilient washer 26 forms a seal between a head portion 28 of the fastener 22 and the base member 13. A threaded bore 29 in the base member 13 receives a drain valve housing 291 which supports a drain member 292. The drain member 292 includes an elongate body 293 threaded in a central bore of a socket 294 of the housing 291. A frusto-conic head 295 of the drain member 292 can engage a frusto-conic seat 296 in the housing 291. A drain hole 297 in the drain member 292 permits discharge of water from the interior of the device along a central bore 298 in the drain member when the drain member is in the raised position shown. A handle 299 is mounted on the drain member for use in turning it.

The spindle member 16 can be formed of transparent plastic material and includes an upper disc portion 30, a lower disc portion 32, and a plurality of tubular portions 34 that span the disc portions 30 and 32. Lower ends of the tubular portions 34 are received in sockets 36 (only one of which is shown) in the lower disc portion 32. Openings 38 are provided in the lower disc portion 32 at the sockets to provide access from the interior of the tubular portions 34 to a mixing chamber 40 in the device below the spindle member 16. Upper end portions of the tubular portions 34 are received in openings 42 in the upper disc portion 30. Openings 44 and 46 in the lower disc portion 32 and the upper disc portion 30, respectively, surrounding the fastener 22 provide access between the chamber 40 and a central socket or upper chamber 48 in the head member 14 above the spindle member 16.

The upper disc portion 30 is provided with an outwardly extending flange 50 which overlies an upper edge of the tubular casing 12 and underlies a shoulder 51 on the head member 14. A gasket 52 forms a seal between the flange 50 and the head member 14. A gasket 53' forms a seal between the flange 50 and the tubular casing 12. The flange 50 is held between the casing 12 and the shoulder 51 on the head member to hold the spindle member in position in the device.

Plug units 53 are disposed inside the tubular portions 34. Each of the plug units 53 can be of the type shown and claimed in my aforementioned co-pending application Ser. No. 134,876 filed Mar. 28, 1980, now abandoned. Each of the plug units 53 includes a spool having end discs 54 and 56 and a central support assembly 58 on which is mounted a wrapping of water absorbent gauze 59. The gauze fills the space between the support assembly 58 and the associated tubular portion 34. An edge of the end disc 56 rest on an inwardly extending flange 60 of the lower disc portion 32. An edge portion of the end disc 54 rests on the tubular portion 34.

The head member 14 includes an entry port 60' and an exit port 62. The entry port 60' communicates with an annular downwardly opening slot 64 through a passageway 66. The exit port 62 communicates with the upper chamber 48 in the head member 14 through a passageway 70. An annular flange 72 separates the annular slot 64 from the upper chamber 48. A generally ring-shaped gasket member 74 forms a seal between the annular flange 72 and the upper disc portion 30 of the spindle member 16 at the central opening 46 in the upper disc portion 30. An outwardly extending flange 76 on the gasket member 74 engages a lower edge of the annular flange 72. A lower edge of a skirt portion 78 of the gasket member 74 engages the upper disc portion 30 at the central opening 46.

The device can be mounted in series with a compressed air line (not shown). Compressed air, which can contain entrained water droplets, enters the device through the entry port 60 and passes through the passageway 66 and through the annular slot 64 into and through the plug units 53. In the plug units, the entrained water is absorbed in the gauze of the plug units and re-evaporated into the air stream. The air passes from the plug units 52 into the mixing chamber 40 where the air is mixed and can become substantially homogenous. From the mixing chamber 40, the air passes upwardly through the opening 44 in the lower disc portion 32 and around the tubular portions 34 and through the opening 46 in the upper disc portion 30 into the upper chamber 48 in the head member 14 and from the upper chamber 48 through the passageway 70 and the exit port 62 to be discharged from the device.

In the event more water than can be accommodated by the plug unit 53 enters the device, the excess water accumulates in the mixing chamber 40 and can be removed by opening of the drain member 292.

The device for eliminating droplets of liquid from a gas stream illustrated in the drawings and described above is subject to structural modification without departing from the spirit and scope of the appended claims.

Having described my invention, what I claim as new and desire to secure by Letters Patent is:

1. A device for eliminating droplets of liquid from a gas stream which comprises a tubular body, a spindle member mounted in the tubular body, the spindle member including an upper disc portion sealed at its edges to the tubular body, a lower disc member sealed at its edges to the tubular body, and a plurality of tubular portions spanning the upper and lower disc portions, a base member closing a lower end of the tubular body, there being a mixing chamber inside the body below the lower disc member, there being openings in the lower disc member providing communication between the mixing chamber and the interior of the tubular portions, a head member closing an upper end of the tubular body, there being a pair of chambers in the head member facing the interior of the tubular body, there being openings in the upper disc portion providing communication between one of the chambers in the head member and the interior of the tubular portions, there being return openings in the upper and lower disc members providing communication between the mixing chamber and the other chamber in the head member, liquid absorbent plug members in the tubular portions, means for introducing liquid carrying gas into the first mentioned chamber in the head member to flow through the plug members so that droplets of liquid in the gas are absorbed in and evaporated from the plug members, the gas being mixed in the mixing chamber, the gas passing from the mixing chamber through the discharge openings in the lower and upper disc members into the other chamber in the head member, and means for discharging the gas from the other chamber in the head member.

2. A device as in claim 1 in which the chambers in the head member are coaxial and the first mentioned chamber in the head member is annular and surrounds the other chamber in the head member.

3. A device as in claim 2 in which an annular flange separates the chambers in the head member and which includes an annular sealing member forming a seal between the annular flange and the upper disc member surrounding the discharge opening in the upper disc member.

4. A device as in claim 1 in which the upper disc member includes an outwardly extending flange which overlies an upper edge of the tubular body and underlies a shoulder on the head member for holding the spindle member in position inside the tubular body.

* * * * *